US007707545B2

(12) United States Patent
Boshier et al.

(10) Patent No.: US 7,707,545 B2
(45) Date of Patent: *Apr. 27, 2010

(54) MANAGING CODE WHEN COMMUNICATING USING HEIRARCHICALLY-STRUCTURED DATA

(75) Inventors: Alan Geoffrey Boshier, Redmond, WA (US); Ashish B. Shah, Sammamish, WA (US); Darshatkumar Shah, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1180 days.

This patent is subject to a terminal disclaimer.

(21) Appl. No.: 11/292,500

(22) Filed: Dec. 2, 2005

(65) Prior Publication Data

US 2006/0107251 A1 May 18, 2006

Related U.S. Application Data

(63) Continuation of application No. 10/185,619, filed on Jun. 28, 2002, now Pat. No. 6,986,121.

(51) Int. Cl.
*G06F 9/44* (2006.01)

(52) U.S. Cl. ........ 717/108

(58) Field of Classification Search ........ 717/104, 717/122, 108; 707/103 R
See application file for complete search history.

(56) References Cited

U.S. PATENT DOCUMENTS

| | | | | |
|---|---|---|---|---|
| 6,356,920 | B1 | 3/2002 | Vandersluis | |
| 6,418,448 | B1 | 7/2002 | Sarkar | |
| 6,635,089 | B1 | 10/2003 | Burkett et al. | |
| 6,636,845 | B2 | 10/2003 | Chau et al. | |
| 6,658,625 | B1 | 12/2003 | Allen | |
| 6,785,673 | B1 | 8/2004 | Fernandez et al. | |
| 6,785,685 | B2 | 8/2004 | Saetarman et al. | |
| 6,832,219 | B2 | 12/2004 | Lal | |
| 6,853,997 | B2 | 2/2005 | Watring et al. | |
| 6,986,121 | B1 | 1/2006 | Boshier | |
| 7,099,885 | B2 * | 8/2006 | Hellman et al. | 707/103 R |
| 2003/0163597 | A1 | 8/2003 | Hellman et al. | |
| 2003/0226109 | A1 | 12/2003 | Adamson et al. | |
| 2004/0006550 | A1 | 1/2004 | Upton | |
| 2006/0248506 | A1 * | 11/2006 | Luo et al. | 717/104 |

OTHER PUBLICATIONS

Mosley, JD; "Revamp UNIX code by Wrapping it in Graphics"; EDN' vol. 37, No. 7; Mar. 28, 1991; pp. 5, 7, 91-98.

* cited by examiner

*Primary Examiner*—Tuan Anh Vu
(74) *Attorney, Agent, or Firm*—Workman Nydegger

(57) ABSTRACT

A description of the hierarchically-structured document is accessed and converted into an early-bound object having at least some of the same properties as the hierarchically-structured document, and having at least some of the methods that may be performed on the hierarchically-structured document. When a function call is placed to the early-bound object, the early-bound object causes the appropriate corresponding changes to be affected on the hierarchically-structured document while maintaining change tracking information for the document. This reduces the difficulty when drafting source code for a program that interfaces with hierarchically-structured documents that can have varying structures and may be governed by complex change tracking rules.

4 Claims, 5 Drawing Sheets

MANAGING CODE WHEN COMMUNICATING USING HEIRARCHICALLY-STRUCTURED DATA

CROSS-REFERENCE TO RELATED APPLICATIONS

This application is a continuation of U.S. patent application Ser. No. 10/185,619, filed Jun. 28, 2002 and entitled "MANAGING CODE WHEN COMMUNICATING USING HEIRARCHICALLY-STRUCUTURED DATA", which is incorporated herein by reference.

BACKGROUND OF THE INVENTION

1. The Field of the Invention

The present invention relates to mechanisms for facilitating software programming; and more specifically, to simplifying the programming process by using managed code that hides much of the complexity of hierarchically-structured data when communicating using the hierarchically-structured data.

2. Related Technology

Computing technology has transformed the way we work and play. Computers consist of hardware components such as for, example, processors and memory capability. However, much of the utility of a typical general-purpose computing system is derived from the capabilities of the software that is available to the computing system, whether that software is locally available, or whether that software is accessed remotely over a network.

Software includes computer-executable instructions that are executed by a processor to thereby cause the processor to control various functions of the computing system. Modern computing systems may perform an extensive variety of complex actions depending on what the computer-executable instructions tell the processor to do. At the lowest physical level of the computing system as viewed from the processor perspective, the computer-executable instructions are essentially a string of one's and zero's that conform to an instruction set that is recognized by the processor. These processor-level instructions are often referred to as "binaries" or "binary instructions".

While binaries are quickly interpretable by processors, they are less intuitive to human beings. Accordingly, software programs are not initially drafted using binary instructions. Instead, software programs are typically first drafted using a more intuitive, human-readable language called "source code." For example, VISUAL BASIC, C++ and DB.NET are all languages used for drafting source code, each containing many words that are adopted from the English language, letters that are taken from the familiar Latin-based alphabet, and mathematical numbers and symbols that are commonly accepted for human expressions of mathematical concepts. While source code is interpretable by human beings, processors (and computer systems) need binary instructions in order to function properly.

Some software, such as compilers and interpreters, convert source code to corresponding binary instructions that perform the same functionality (when executed by a processor) as was represented by the source code. Accordingly, source code allows for human programmers to author programs that would otherwise not be possible. While source code facilitates programming and is typically readable by programmers with sufficient training, source code can still be quite difficult to draft especially for complex programs.

Program complexity is often measured in terms of "lines of code". Many programs number in the thousands of lines of code. Accordingly, even with the most skilled of programmers, there are often initially errors in the source code that prohibit successful compilation. Even when these errors are discovered and corrected resulting in successful compilation, there are often unintended functionality (often referred to as "bugs") that are present in the program. The difficulty in compiling a program, and the probability of introducing unintended functionality into the program, tends to increase the more the lines of code there are in the program. Accordingly, methods have been developed to manage code to thereby simplify the source code needed to accomplish given functionality.

One conventional way of doing this is to organize functional components of the program into segments often referred to as "objects". These objects have corresponding properties and corresponding methods that may be invoked. Objects may communicate using standards called Application Program Interfaces (APIs). Objects may communicate locally or even remotely over a network using APIs.

For example, recently, the use of eXtenstible Markup Language (XML) has become more accepted as a way to communicate between objects. When remotely communicating over a network, sometimes Simple Object Access Protocol (SOAP) is used as a mechanism to transport an XML document between different network sites. According to convention, the XML document may be transmitted as an XML document within the body portion of a SOAP envelope.

XML is useful partly because of its organization as a hierarchically-structured tree of nodes, each node comprising a tag that may contain descriptive attributes. XML is also useful because of its ability to follow extendable patterns that may be dictated by the underlying data being described. For example, a contact may have one pattern or schema, while a calendar entry may have a very different pattern or schema. As the need to describe certain aspects of these items arises, the pattern may be extended to include nodes that describe such aspects of the item. Accordingly, XML is gaining acceptance as a method for communicating data.

Some APIs involve the manipulation of XML documents following a particular schema. Because of the wide variety of items that may be described using XML, there are a wide variety of XML schemas. In can be relatively difficult for many programmers to keep track of the structure of a particular schema when they desire to draft code that manipulates a data item that is described by the XML document. There may also be other intricacies of an API that involves operations on XML documents. For example, perhaps only portions of the XML may be operated on as an atomic entity. Adding to the complexity, perhaps it is necessary not only to track changes to the XML document as a whole, but perhaps to each atomic portion of the XML document that may be separately operated upon. Thus, it can be a difficult task for many programmers to deal directly with the hierarchically-structured XML document.

BRIEF SUMMARY OF THE INVENTION

The principles of the present invention relate to mechanisms for allowing a programmer to draft source code that manipulates a hierarchically-structured document without requiring that the programmer draft source code that specifically references the structure (e.g. related to change tracking) of the hierarchically-structured document. In one embodiment, the principles of the present invention are implemented in a network environment in which a client is network connectable to a variety of network services such as, for example, web services. Each service maintains hierarchically-structured documents (e.g., XML documents) that are valid with respect to one or more schemas. For example, there might be one web or other network service that maintains XML documents that follow a particular pattern or schema for contact information, another service that maintains XML documents that follow a particular schema for calendar information, and so forth. Also, modifications to the document may be performed without needing to download the entire document, modify it, and upload the complete document back to the service.

There are several factors that may make it convenient for a programmer to not have to deal directly with the structure of a hierarchically-structured document in such an environment. For example, since there are many different types of things that may be described by an XML document, there may potentially be many standardized schemas that may be followed for a variety of different network services. Accordingly, when drafting a program that is to interface with hierarchically-structured documents, a programmer that directly interfaces with hierarchically-structured documents would need to have knowledge of which particular schema the document follows, as well as how the schema is organized. In addition, the programmer would need to deal with the potentially cumbersome process of programming to a raw XML programming model.

Also, in many cases, there may be standard methods that are used when allowing the client to manipulate the content of (or query) any XML document, no matter what schema the XML document follows. These methods provide the means for changes made locally on the client application to be communicated to the XML document managed by the service. For example, regardless of whether the XML document follows a calendar schema, a wallet schema, a contacts schema, or an application setting schema, certain methods such as insert, delete, query, replace, or update may be common for all of the schemas due to the generic nature of the methods. These method calls may be complex and cumbersome to construct directly as they are themselves expressed in XML, and parsing the responses is also complex since they are XML too. Furthermore, there may also be customized methods that are tailored to each of the schemas. It may require some study for programmers to keep track of what custom methods are offered for the particular schema(s) that they are interfacing with. The methods may have common security behaviors related to, for example, encryption, authentication, digital signatures and the like. These security behaviors may be cumbersome and complex to program directly. They also may have common headers (e.g., SOAP headers when the methods are SOAP methods) which are routine but tedious to program directly. Programmers can be relieved of all of these tasks.

Furthermore, in order to reduce the variety of requests that the service would have to deal with, it may be that only portions of the hierarchically-structured document may be operated upon as an atomic entity. For example, when changing the area code of a telephone number for a given person in a contacts list, it may be necessary to submit a replacement telephone numbers XML segment for that contact that re-lists all of the relevant telephone numbers for the contact, but with the correct area code inserted for the telephone number that is to be corrected. Keeping track of these modifications rules (e.g., of what can, and cannot, be operated upon as an atomic entity) would require time for studying the schema. Rather than invest such time, programmers may instead choose to replace the entire XML document, instead of just the particular atomic XML segment(s) of relevance, thereby resulting in a waste of processing and bandwidth resources. This might also result in updates from other clients being overwritten, even though the client that caused the overwriting did not intend to do so.

Finally, the different atomic entities of the XML document that may be separately operated upon may have their own change tracking information. While working with the XML document, the programmer would have to track any changes to the document and then synthesize those changes into a change unit consistent with the modification rules when the changes need to be applied to the service.

This is not to say that a programmer may not become well-familiar with how to draft source code that interfaces directly with the structure of the hierarchically-structured document with some effort, but the present invention makes it easier for the programmer by no longer requiring that the programmer draft source code that directly interfaces with the structure of the hierarchically-structured document or manage change tracking by himself.

Instead, a description of the hierarchically-structured document of the same class as the hierarchically-structured document is accessed by programming tools in accordance with the present invention. For example, Web Services Description Language (WSDL) is an XML-formatted language that is use to describe a service's capabilities and, in particular, the methods exposed by the service. Another type of description language may be, for example, an XML Schema Description (XSD) document. An XSD document defines the structure of the data that is passed in and out of the methods described by the WSDL document.

The description document is then converted into at least one early-bound object having at least some of the same properties as the hierarchically-structured document, and having at least some of the methods that may be performed on the hierarchically-structured document. In one embodiment, the description is converted into two types of objects specific to the service that it describes, a connection object that embodies the methods that can be invoked on the service, and data objects that embody the data types that are passed in and out of those methods. These early-bound data objects correspond to the structure of the hierarchically-structured document and know how to track changes to the document, consistent with the change-tracking rules associated with the document structure.

Early-bound objects are quite familiar to most programmers. Accordingly, software programmers are often more comfortable drafting source code that interfaces with an early-bound object, than to a hierarchically structured XML document.

When modifications are made to the properties of the early-bound object, the early-bound object can cause the appropriate corresponding changes to be effected on the underlying hierarchically-structured document. To do this, the object needs to communicate only the incremental changes to the service since the object itself tracks changes. The object may interface with other functions through, for example, a Dynamic Link Library (DLL) file for functions that are more common. Functions that are either directly implemented by the object or that are indirectly implemented via, for example, a DLL file may keep track of the structure of the hierarchically-structured document, what portions of the document may be operated upon as an atomic entity, and how to maintain change tracking information. Accordingly, the programmer need not be concerned about all of those details. This makes it easier for the programmer to deal in an environment in which the program is to interface with such hierarchically-structured documents since the programmer only has to draft source code to interface with the familiar form of an early-bound object.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for allowing a programmer to draft source code that manipulates a hierarchically-structured document without requiring that the programmer draft source code that specifically references the structure of the hierarchically-structured document. Instead, a description of the hierarchically-structured document of the same class as the hierarchically-structured document is accessed and converted into one or more early-bound objects having at least some of the same properties as the hierarchically-structured document, and having at least some of the methods that may be performed on the hierarchically-structured document. These early-bound objects correspond to the structure of the XML document and know how to track changes to the document, consistent with the change-tracking rules associated with the document structure.

When a function call is placed to the early-bound object, the early-bound object causes the appropriate corresponding changes to be affected on the hierarchically-structured document while maintaining change tracking information for the document. This reduces the difficulty when drafting source code for a program that interfaces with hierarchically-structured document that can have varying structures and may be governed by complex change tracking rules.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
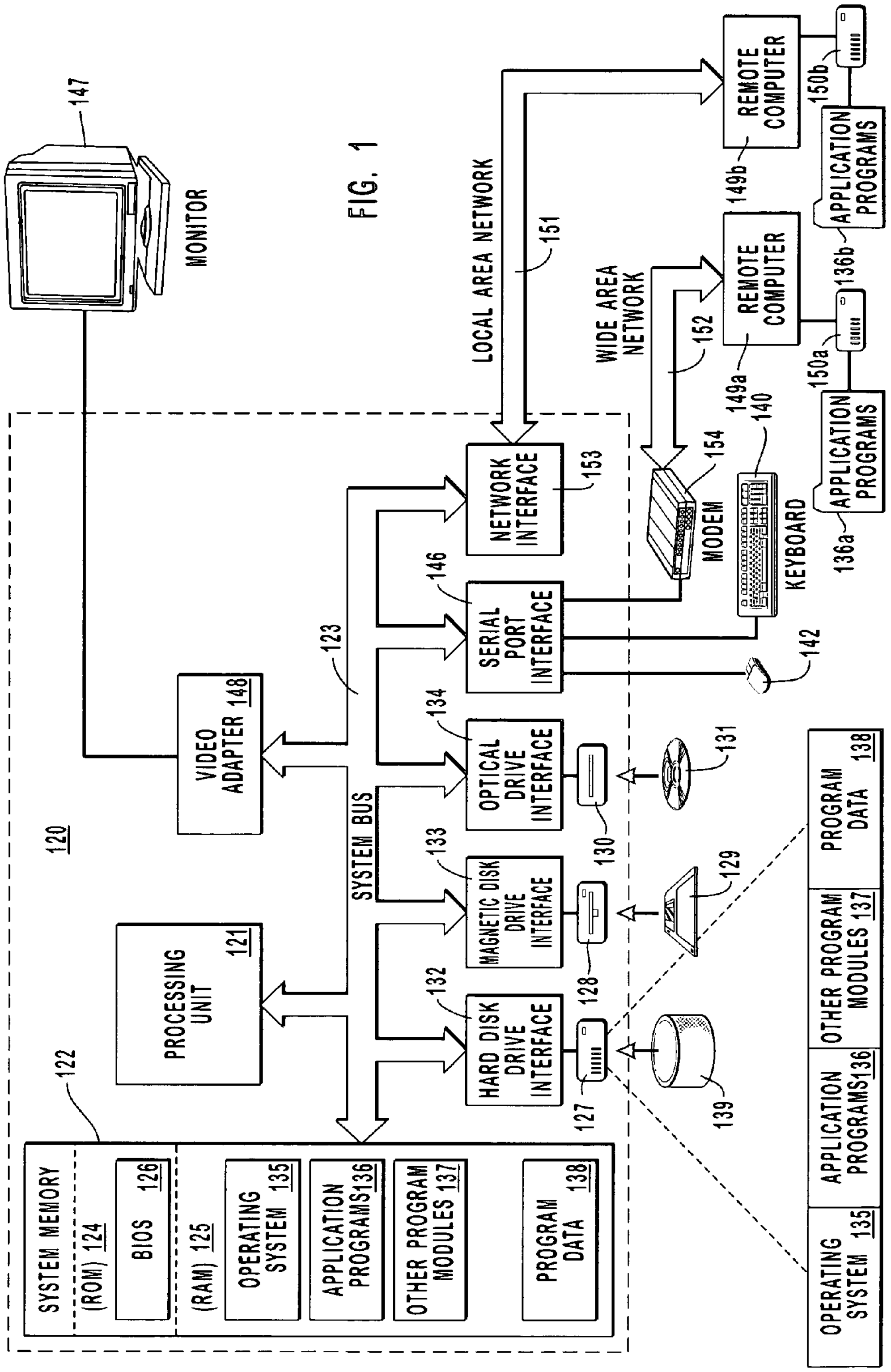
FIG. 1 illustrates a suitable computing system in which the principles of the present invention may be employed.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, and the like, that perform particular tasks or implement particular abstract data types.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 2:
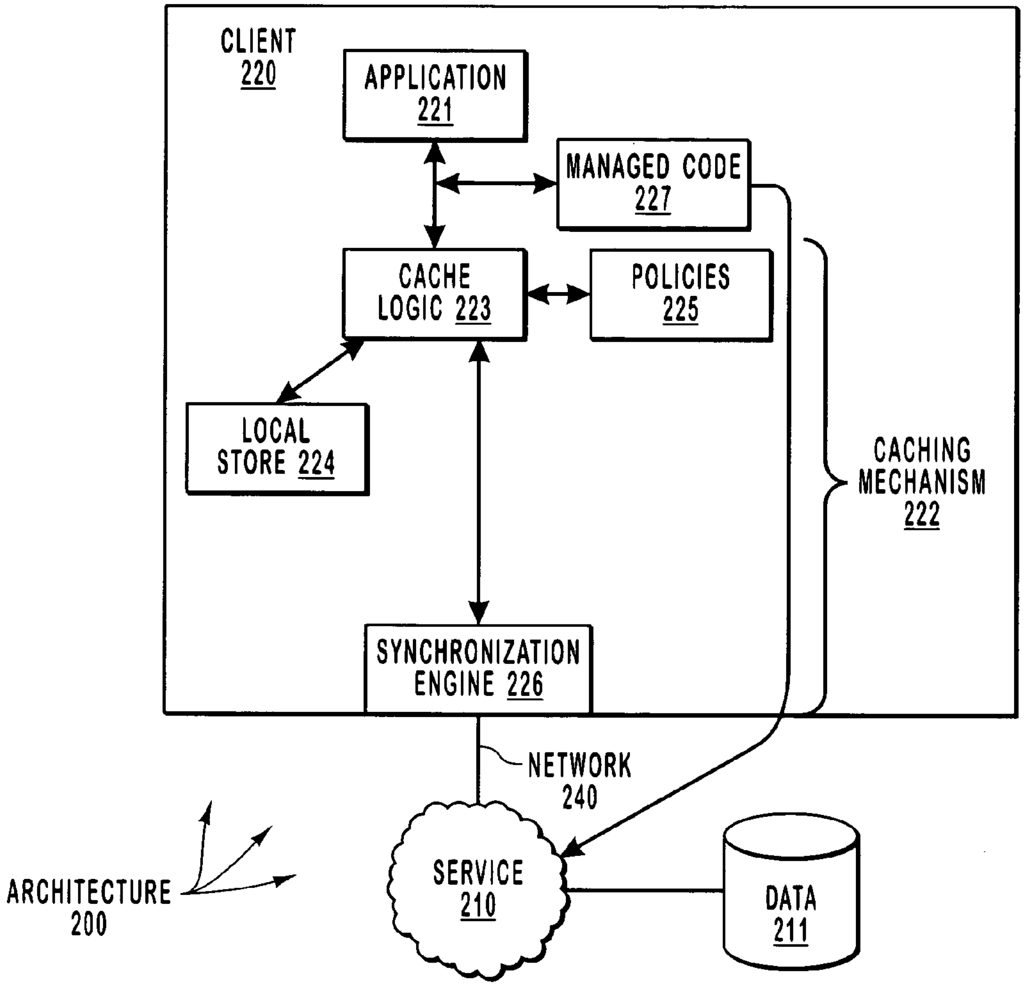
FIG. 2 illustrates a more specific architecture in which the principles of the present invention may be employed.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. Throughout this description, element numbers begin with the same number as the figure in which the corresponding elements were first introduced. For example, all of the element numbers in FIG. 1 are numbered in the 100's while the element numbers in FIG. 2 are number in the 200's, and so forth. If the same element is re-illustrated in subsequent drawings, however, the corresponding reference number will remain the same.

The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 46 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149*a* and 149*b*. Remote computers 149*a* and 149*b* may each be another personal computer, a server, a router, a network PC, a peer device or other common network node, and typically include many or all of the elements described above relative to the computer 120, although only memory storage devices 150*a* and 150*b* and their associated application programs 136*a* and 136*b* have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

FIG. 2 illustrates an architecture 200 that includes a service 210 and a client 220 that are coupled together via network 240. The client 220 may be, for example, the computer 120 described above with respect to FIG. 1, although the client 220 may be implemented by any computing device or system. The service 210 comprises a computing entity or a number of computing entities that cooperatively interact to maintain hierarchically-structured data 211. The client 220 includes an application 221 that potentially has interest in accessing the data 211. If the client 220 were computer 120, the application 221 may be, for example, the operating system 135, one of application programs 136, or perhaps one of the other program modules 137. In that case, the client 220 may have interest in incorporating at least part of the data 211 as its own program data 138.

One way for the client 220 to access the hierarchically-structured data 211 is to request the data directly from the service 210 over the network 240. This may be performed directly via the managed code module 227. This is advantageous in that the returned data is fresh as of the requested time, but disadvantageous in that the properties of the network 240 may cause a response to the request to be noticeably slow with a relatively high latency. In order to avoid this potentially slow response, the client 220 has a sophisticated caching mechanism 222 as represented by the various modules to the left of the brackets 222.

When a request for particular data is dispatched by the application 221, the caching mechanism 222 determines whether the request may be satisfied by data already locally accessible by the client 220. If the local data is sufficiently fresh, then the request will be satisfied locally and not by sending the request over the network 240 to the service 210. This caching is advantageous in that a response to the request is much quicker than would be the response if the request had been sent over the network 240.

The caching mechanism includes a cache logic module 223. When the application 221 would like particular data from the service 210, the application 221 submits a request for the data to the cache logic module 223. The cache logic module 223 then determines, based on a policies module 225, whether the request would be best satisfied by immediately acquiring a cached copy of the requested data from a local store 224, or whether it was beneficial to obtain a copy of the requested data from the service 210 instead. If a copy from the service 210 is requested, the synchronization engine 226 may acquire the requested data from the service 210. Alternatively, the policies module 225 may dictate that the synchronization engine 226 should first synchronize all or a portion of the data 211 before the cache logic 223 acquires the data from the local store 224.

In one embodiment, the service 210 provides the data 211 in an eXtensible markup language format. XML segments comprise a hierarchically-structured tree in which each node in the tree is represented by a name-value pair called a tag. Each tag may have attributes that comprise further name value pairs that form the tag. XML segments are well known in the art and are widely used to represent data in a hierarchically-structured tree. The shape and characteristics of the XML tree may be defined by an XML Schema Description (XSD) language document or a Web Services Description Language (WSDL) document. One of the beneficial properties of XSD and WSDL is that it allows for different XML structures to accommodate varying underlying properties of an item being described. In addition, XSD allows XML documents to be extended as the need for additional information regarding the item is recognized as being useful. The use of such schemas allows for applications to not only read the data, but to understand the data and thereby perform intelligent actions. For example, instead of just reading the data "1812", the application may understand that the data represents a year. Accordingly, the application may provide options to retrieve further historical data regarding the year 1812.

Accordingly, the application 221 interfaces with the hierarchically-structured document either by accessing the hierarchically-structured data 211 from the service 210 via managed code 227, or by accessing the synchronized form of the data from the local store 224. When requests to operate on a particular hierarchically-structured document are submitted by the application 221 to the cache logic module 223, there may be a managed code module 227 that allows for the program to express the operations to be performed without referencing the structure of the hierarchically-structured XML document.

Figure 3:
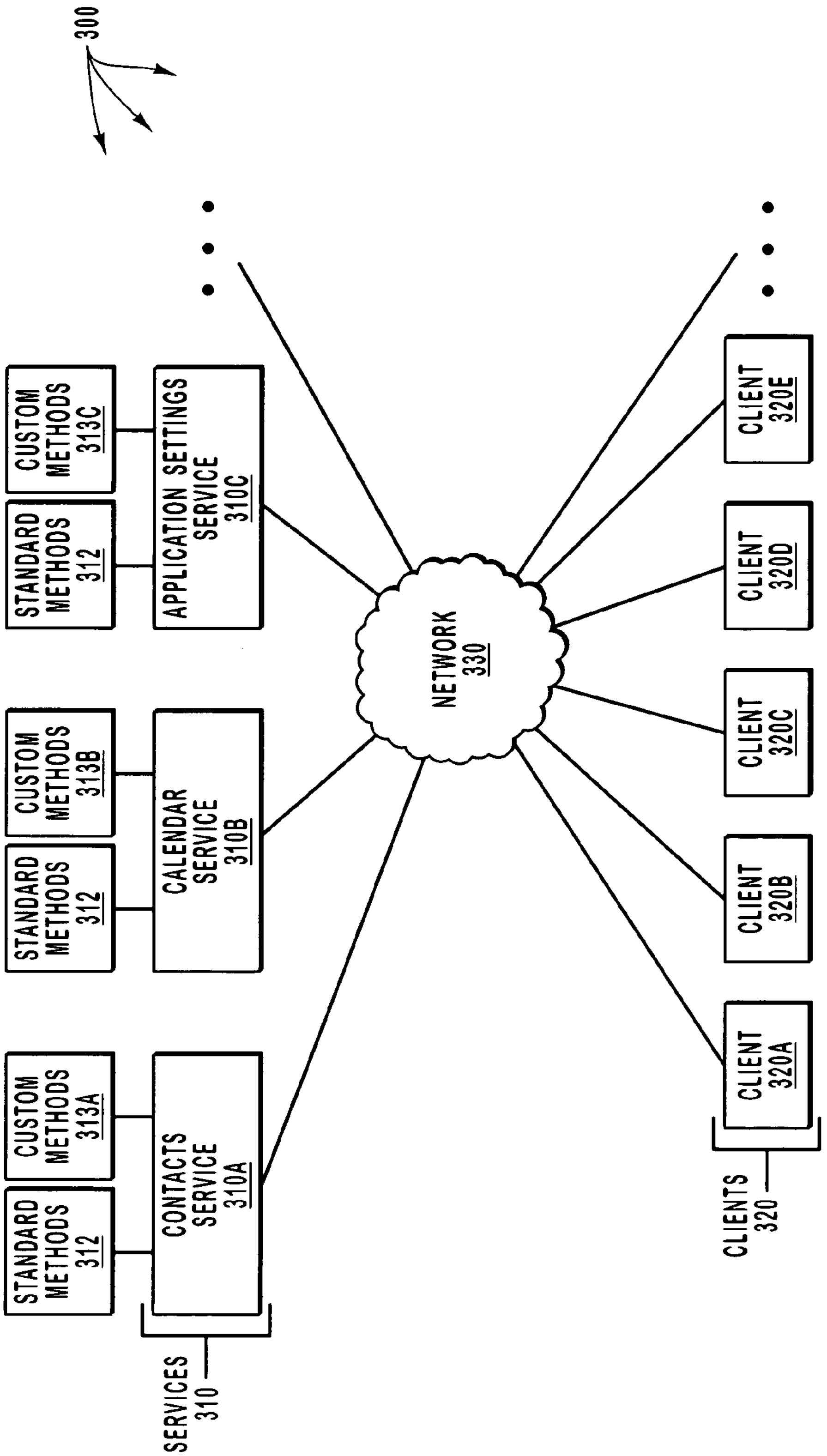
FIG. 3 illustrates a network environment that includes a number of clients and a number of services, each service maintaining documents of a particular pattern or schema.

In a network environment, there may several clients such as client 220 in communication with several services such as service 210. For example, FIG. 3 illustrates a network environment 300 in which multiple clients 320 interface with multiple services 310 over a network 330. The clients 320 may be configured as described above for client 220. Although five clients 320A through 320E are illustrated, there may be other numbers of clients interacting with services over the network 330. The network 330 may be any network or combination of networks such as, for example, the Internet. If the network 330 was the Internet, for example, many thousands of such clients may exist.

The services 310 may each maintain hierarchically-structured documents (e.g., XML documents) of at least one particular class. For example, there might be one network service 310A that maintains XML documents that follow a particular pattern or schema for contact information, another network service 310B that maintains XML documents that follow a particular schema for calendar information, another network service 310C that follows a particular schema for application setting information, and so forth.

There are several factors that may make it convenient for a programmer to not have to deal directly with the structure of a hierarchically-structured document in such an environment. For example, since there are many different types of things that may be described by an XML document, there may potentially be many standardized schemas that may be followed for a variety of different network services. Accordingly, when drafting a program that is to interface with hierarchically-structured documents, a programmer that directly interfaces with hierarchically-structured documents would need to have knowledge of which particular schema the document follows, as well as how the schema is organized.

Also, in many cases, there may be standard methods that are used when dealing with any XML document, no matter what schema the XML document follows. For example, regardless of whether the XML document follows a calendar schema, a wallet schema, a contacts schema, or an application setting schema, certain methods such as insert, delete, query, replace, or update may be common for all of the schemas due to the generic nature of the methods. However, there may also be customized methods that are tailored to each of the schemas. It may require some study for programmers to keep track of what custom methods are offered for the particular schema (s) that they are interfacing with. For example, each of the network services 310 has standard methods 312. However, the contacts network service 310A has custom methods 313A, the calendar network service 310B has custom methods 313B, and the application setting service 310C has custom methods 313C.

Furthermore, in order to reduce the variety of requests that the service would have to deal with, it may be that only portions of the hierarchically-structured document may be operated upon as an atomic entity. For example, when changing the area code of a telephone number for a given person in a contacts list, it may be necessary to submit a replacement telephone numbers XML segment for that contact that re-lists all of the relevant telephone numbers for the contact, but with the correct area code inserted for the telephone number that is to be corrected. Keeping track of what can, and cannot, be operated upon as an atomic entity may require time for studying the schema. Rather than invest such time, programmers may instead choose to replace the entire XML document, instead of just the particular atomic XML segment(s) of relevance, thereby resulting in a waste of processing and bandwidth resources.

In one example, the portions that may be operated upon as an atomic entity are defined by the schema as being blue or red nodes. Blue nodes may have one set of operations performed thereon as an atomic entity, while red nodes may have another set of operations performed thereon. The schema may also define black nodes which may potentially be child nodes of a blue or red node. These black nodes may not be operated upon as an atomic entity. Instead, if a black node is desired to be operated upon (e.g., changed, inserted, or queried), the operation is instead performed on a parent or ancestor blue or red node. While this data model reduces the complexity of the application that maintains the hierarchically-structured documents, the programmer would need to keep track of what nodes may be atomically operated upon in order to most efficiently interface with the hierarchically-structured document.

Finally, the different atomic entities of the XML document that may be separately operated upon may have their own change tracking information. It would also require invested time for programmers to track when a change tracking information is to be changed, to what, and how the change tracking information is inherited throughout the various nodes of the hierarchically-structured document.

This is not to say that a programmer may not become well-familiar with how to draft source code that interfaces directly with the structure of the hierarchically-structured document with some effort, but the principles of the present invention makes it easier for the programmer by no longer requiring that the programmer draft source code that directly interfaces with the structure of the hierarchically-structured document.

Figure 4:
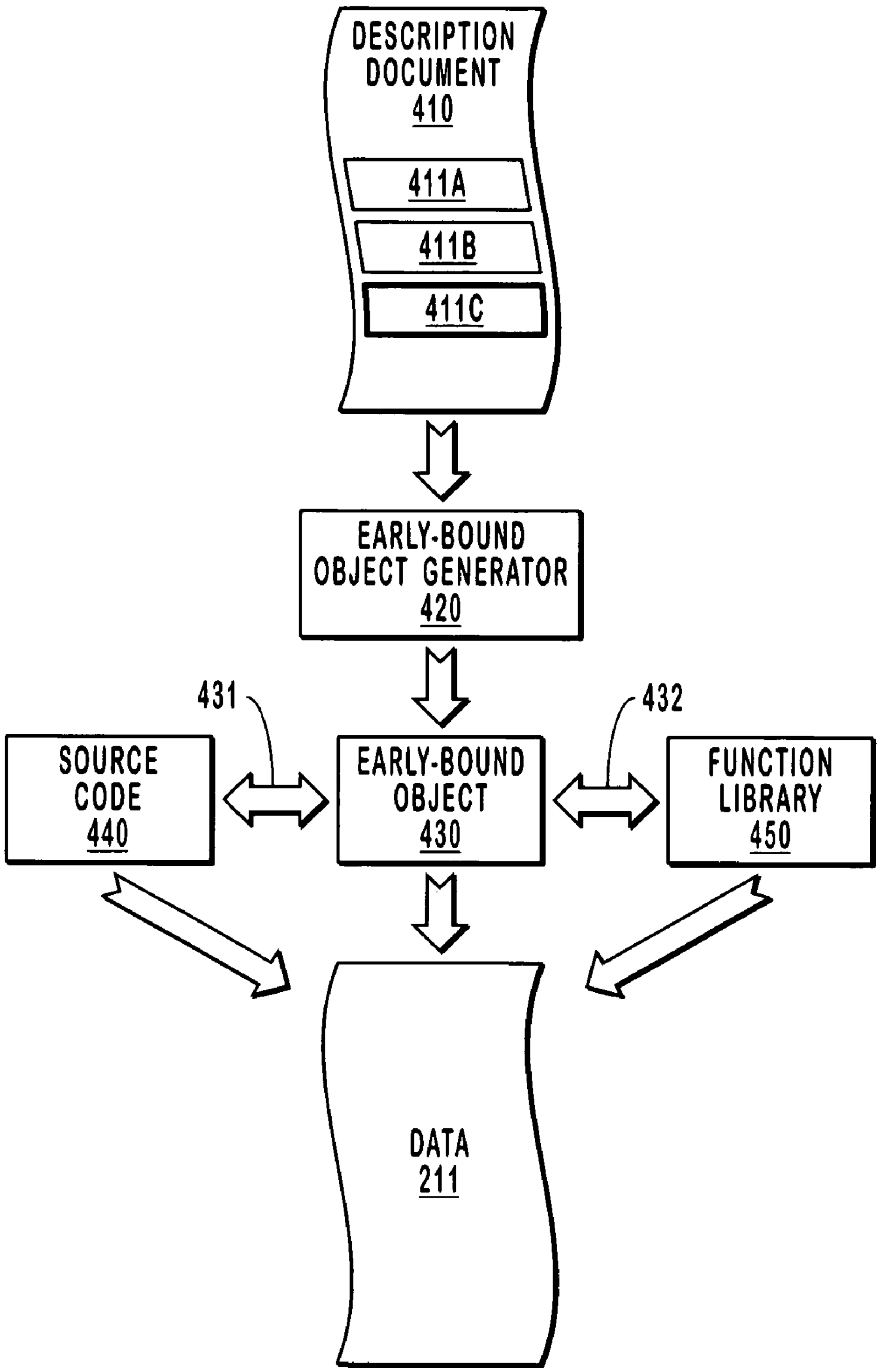
FIG. 4 schematically illustrates a logical flow of data involved with drafting a program that interfaces with a hierarchically-structured document without requiring source code that directly interfaces with the hierarchically-structured document.
Figure 5:
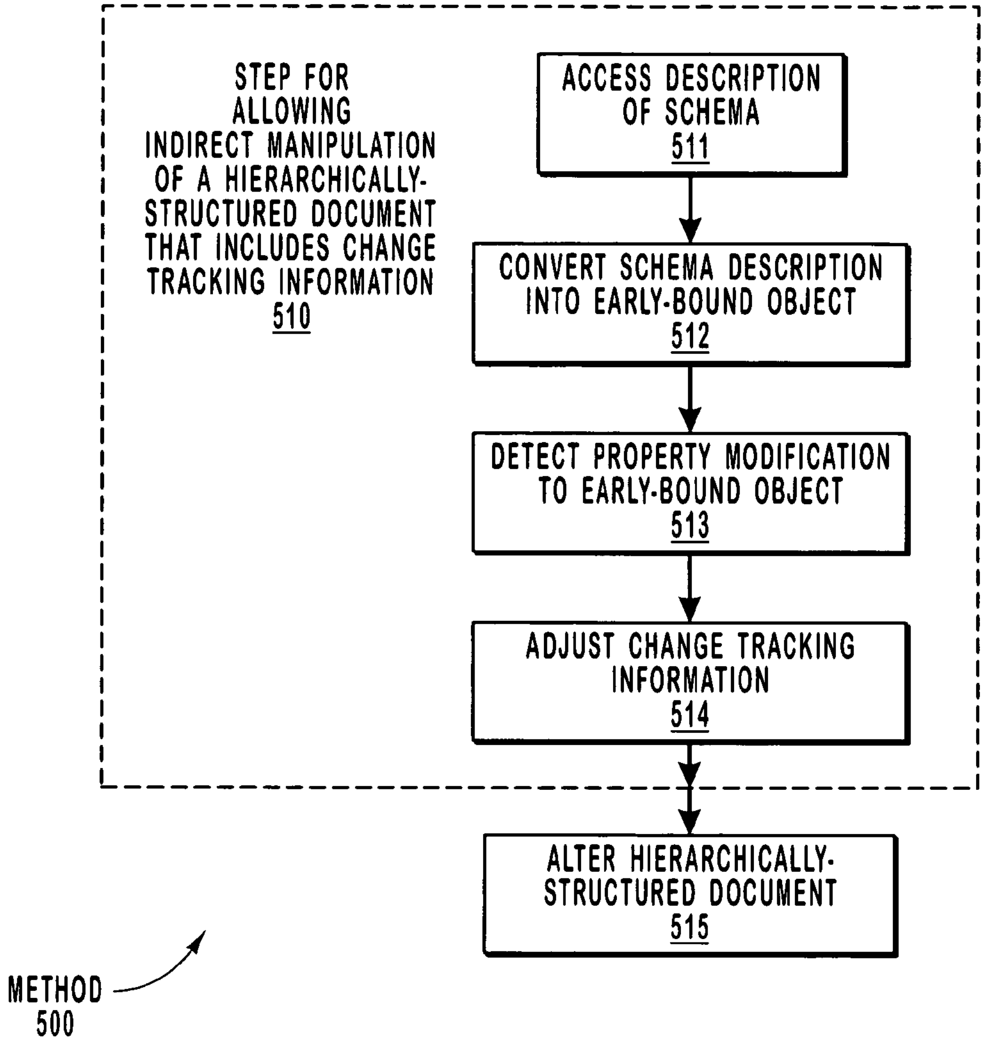
FIG. 5 illustrates a method in accordance with the invention for allowing a programmer to more easily draft source code for a program that interfaces with hierarchically-structured documents.

FIG. 4 illustrates several logical flows that may be implemented by the managed code module 227. FIG. 5 illustrates a method 500 for allowing a programmer to draft source code that causes interaction with hierarchically-structured documents by interfacing with an early-bound object, rather than with the hierarchically-structured document itself. The logical flows of FIG. 4 will be described with frequent reference to the method of FIG. 5.

The method 500 includes a functional result-oriented step for allowing a function call for indirect manipulation of a hierarchically-structured document that includes change tracking information (step 510). While this step may include any corresponding acts for accomplishing this result, the step is illustrated as including corresponding acts 511, 512, 513 and 514. In particular, a description of the schema of a hierarchically-structured document of a particular class is accessed (act 511). Referring to FIG. 4, the description document 410 is accessed. The description document 410 has properties 411A, 411B and 411C and methods (either express or implied) that may be performed on hierarchically-<structured documents of the particular class. At least one of the properties (e.g., property 411C) includes change tracking information as represented by the box 411C having a thicker boundary. For example, if the hierarchically-structured document was an XML document, the change tracking information may be an attribute of any portion of the XML document that may be separately operated upon.

The description document may be, for example, an XSD or WSDL document as previously described. A WSDL document is an XML-formatted language that describes methods exposed by a particular service, while an XSD document defines the structure of the data that is passed in and out of the methods described by the WSDL document.

The step 510 also includes an act of converting the description of the schema into at least one early-bound object that has data fields for storing at least some of the properties as well as at least some of the methods that correspond to the hierarchically-structured documents of the particular class (act 512). Referring to FIG. 4, this act is indicated by the description document 410 being received by the early-bound object generator 420. As mentioned above, the description document 410 may be a combination of a WSDL document and an XSD document for a given service.

The early-bound object generator 420 then, in turn, generates the early-bound object 430. In one embodiment, the description document is converted into two types of objects specific to a given service. Namely, a connection object embodies the methods that can be invoked on the service. In addition, a data object embodies the data types that are passed in and out of those methods.

An early-bound object representation of an XML type is a representation in which the XML attributes and XML elements of the XML type are surfaced as properties of the programmable object. In most programming languages, this then lends itself to a fairly intuitive programming syntax (e.g Contact.FirstName when referring to the first name of a contact). Early-bound objects are quite familiar to most programmers. Accordingly, software programmers are often more comfortable drafting source code that interfaces with an early-bound object, than to a hierarchically structured XML document. There are conventional methods available for performing the conversion of an XML document into a corresponding early-bound object. For example, .NET™ FRAMEWORK is a conventionally available product that may be used to convert hierarchically-structured documents into early-bound objects.

The step 510 also includes an act of detecting a property modification to the early-bound object (act 513). In FIG. 4, this is represented by the source code 440 communicating with the early-object via function call 431. Then, the early-bound object corresponding to the modification adjusts the property that includes changing tracking information (act 514) in response to the detection of the property modification and in accordance with change tracking rules. Accordingly, the programmer need not himself keep track of change information. Instead, the early-bound object adjusts and tracks the change information.

In addition to change tracking information, the generated connection early-bound object may include methods that abstract the process of discovering an appropriate service from the view of the programmer. For example, the connection early-bound object may include a method that contacts a centralized service that is capable of finding an appropriate calendar (or other) service for a given user. In addition, the methods exposed by the connection object (and also the service) may have common security behaviors related to, for example, encryption, authentication, digital signatures and the like. These security behaviors may be cumbersome and complex to program directly. They also may have common headers (e.g., SOAP headers when the methods are SOAP methods) which are routine but tedious to program directly. Programmers can be relieved of all of these tasks.

The corresponding XML document is then altered as appropriate for the function call (act 515). The early-bound object 430 may accomplish the appropriate alteration of the hierarchically-structured document by, for example, making function calls 432 using a function library 450. One type of function library is a Dynamic Link Library (DLL) file for functions that are more common. Functions that are either directly implemented by the object or that are indirectly implemented via, for example, a DLL file may keep track of the structure of the hierarchically-structured document, what portions of the document may be operated upon as an atomic entity, how to maintain change tracking information, or other common operations. Accordingly, the programmer need not be concerned about all of the details involved with manipulating a hierarchically-structured document. This makes it easier for the programmer to deal in an environment in which the program is to interface with such hierarchically-structured documents since the programmer only has to draft source code to interface with the familiar form of an early-bound object.

Various classes that may be implemented by the managed code module 227 will now be described. While specific class are described herein, one of ordinary skill in the art will recognize, after having reviewed this description, that there are many software implementations that fall within the scope of the present invention. The example classes are only one possible implemented and are provided by way of illustration only, and not to limit the scope of the invention.

The IServiceConnection class is an interface implemented by all classes that manage connections to a service such as service 210 in FIG. 2. One such implementation is the SoapHttpServiceConnection class described further below. The following is source code that describes the IServiceConnection class:

```
[Serializable]
interface IServiceConnection
{
  // Properties
  string           ServiceName { get; }
  string           DocumentName { get; }
  string           Owner { get; }
  ConnectionState  State { get; }
  // Methods
  void Open( );
  void Open(string username, string password);
  void Close( );
}
```

The void Open( ) and void Open(string userName, string password) methods may be called to open a connection to the specified service. The first variant uses implicit credentials for access authorization, whereas the second provides explicit credentials. The void Close( ) method closes the connection and frees any associated resources. Other classes also may include these open and close methods.

The string DocumentName {get;} property gets the name of the service document to connect to. For example, referring to FIG. 3, each service 310 may maintain a "content" document and a "role list" document for each data owner for whom it maintains data. The content document includes the main information of interest (e.g., contact information for a contacts service), while the role list document contains access control information and permissions.

The string Owner {get;} property gets the name of the owner of the service instance to connect to. Each document at a service may be owned by a particular entity such that access to that document is controlled by that entity. The string ServiceName {get;} property gets the name of the service to connect to (e.g. “Contacts” or “Calendar”). The ConnectionState State {get;} property returns the current state of the connection. Other classes may also include a similar DocumentName, Owner, ServiceName and State properties.

The SoapHttpConnection class is used to manage a connection to a service over Simple Object Access Protocol/HyperText Transport Protocol (SOAP/HTTP). The following source code describes the SoapHttpConnection class:

```
abstract class SoapHttpConnection :
  System.Web.Services.Protocols.SoapHttpClientProtocol,
  IServiceConnection
{
  // Constructor
  protected SoapHttpConnection ( );
  protected SoapHttpConnection (string serviceName);
  protected SoapHttpConnection (string serviceName, string
  documentName);
  protected SoapHttpConnection (string serviceName, string
    documentName, string owner);
  // Methods
  protected string     GetMethodNameFromRequest
  (System.Xml.XmlNode node);
  protected void       PrepareHeaders (string methodName);
  protected virtual void    SaveHeaders ( );
  protected virtual void    RetrieveHeaders (string methodName);
  protected System.Xml.XmlElement XmlSerialize (object obj);
  protected object     XmlDeserialize (System.Xml.XmlElement
  xmlHeader);
  protected override void        Dispose (bool disposing);
  void         Open( );
  void         Open(string username, string password);
  void         Close( );
  //
  // Properties
  string       ServiceName { get; }
  string       DocumentName { get; }
  string       Owner { get; }
  ConnectionState    State { get; }
}
```

The SoapHttpConnection (string serviceName, string documentName) and SoapHttpConnection (string serviceName, string documentName, string owner) constructors initialize a new SoapHttpConnection instance. The supplied parameters provide specific initial values for the ServiceName, DocumentName and Owner properties. If the Owner property is not supplied, then the value will be taken from the WindowsIdentity.GetCurrent( ) property. The user name property is taken from the name portion of the WindowsIdentity.GetCurrent( ) property. If the connection state of the object is Open or Opening, then no further action is taken.

ServiceAdapter is a class of the managed code module 227 that defines the methods by which data objects are filled with XML data from the service and have their changes committed against the service. The following source code defines this class:

```
class ServiceAdapter
{
  // Constructor
  ServiceAdapter(IServiceConnection serviceConnection);
  // Properties
  IServiceConnection     ServiceConnection { get; }
  // Methods
  void       Update(IServiceData serviceData);
  void       Fill(IServiceData serviceData);
  void       Fill(IServiceData serviceData, string xpath,
    System.Xml.Serialization.XmlSerializerNamespaces namespaces);
}
```

The ServiceAdapter (IServiceConnection serviceConnection) constructor initializes a new ServiceAdapter. The supplied parameter provides the connection object that is used to communicate with the service.

The void Update(IServiceData serviceData) method commits changes in the passed-in data objects to the underlying service. The data is specified as a single IServiceData object. If the operation is successful, then IServiceData.AcceptChanges will be automatically called on the service data object supplied to the call.

The void Fill(IServiceData serviceData) and the void Fill (IServiceData serviceData, string xpath, System.Xml.Serialization.XmlSerializerNamespaces namespaces) methods populate the passed-in IServiceData object from the underlying service. Typically the XPath that is used as the basis for the underlying query will be constructed automatically from the supplied data target, in which case the first form of the method is used. However the caller can supply explicit XPath expressions to override this using the second form of the method. Most typically the second form above is used to filter the items returned into a ServiceObjectCollection subclass instance or a ServiceAnyObjectCollection instance. If the operation is successful then IServiceData.AcceptChanges will be called on the object supplied to the call. The IServiceConnection ServiceConnection {get;} property defines the proxy used by this ServiceAdapter to communicate with the service.

As previously mentioned, the principles of the present invention make it easier for some programmers by allowing them to interface with early-bound objects, rather than with the underlying hierarchically-structured document. The primary purpose of the majority of these early-bound classes is to provide a basis by which early-bound (strongly typed) data classes for a specific service can be “self-auditing”; i.e. the objects themselves know how they have been modified by the client, and use this information as the basis for correctly updating the service that maintain the corresponding hierarchically-structured documents when the changes are committed.

The IServiceData interface is implemented by all early-bound data objects as is structured as follows:

```
interface IServiceData
{
  // Properties
  IServiceData Parent { get; }
  ChangeState State { get; }
  bool    HasChanges { get; }
  // Methods
  void AcceptChanges ( );
  void SetParent (IServiceData parent, string propertyNameInParent);
}
```

Calling the void AcceptChanges( ) method marks the change state of the object as ChangeState.Unchanged. It also informs the parent object that this object should be regarded as unchanged. This method is called internally by ServiceAdapter.Update and ServiceAdapter.Fill in the result of a successful operation.

The void SetParent(IServiceData parent, string propertyNameInParent) method assigns the specified parent to this object and sets the name of the property that represents this object in the parent.

The IServiceData Parent {get;} property returns the parent of this object, or null if the object has no parent. The ChangeState State {get;} property returns the current change state of this object. The bool HasChanges {get;} property returns an indication of whether the object has been changed since the last time it was populated from the service or AcceptChanges was called.

The ServiceObject class is the basis for all automatically generated data objects that correspond to single values for which the type is known at generation time and is structured as follows:

```
[Serializable]
abstract class ServiceObject : IServiceObject
{
  // Constructors
  protected ServiceObject ( );
  protected ServiceObject (IServiceData parent, string propertyNameInParent);
  // Methods
  void Delete ( );
  protected virtual void OnPropertyChanging (PropertyChangingEventArgs e);
  protected virtual void OnPropertyChanged
      (System.ComponentModel.PropertyChangedEventArgs e);
  protected void SetAnyProperty(ref ServiceAnyObject currentValue,
    ServiceAnyObject new Value, string propertyName);
  protected void SetStringProperty(ref string currentValue, string newValue, string
    propertyName);
  protected void SetBoolProperty(ref bool currentValue, bool newValue, string
    propertyName);
  protected void SetShortProperty(ref short currentValue, short newValue,string
    propertyName);
  protected void SetIntProperty(ref int currentValue, int newValue, string
    propertyName);
  protected void SetLongProperty(ref long currentValue, long newValue, string
    propertyName);
  protected void SetEnumProperty(ref int currentValue, int newValue, System.Type
    enumType, string propertyName);
  protected void SetDateTimeProperty(ref System.DateTime currentValue,
    System.DateTime newValue, string propertyName);
  protected void SetByteArrayProperty(ref Byte[ ] currentValue, Byte[ ] newValue,
    string propertyName);
  protected void SetSpecifierProperty(ref bool currentValue, bool newValue, string
    specifiedPropertyName);
  void RaisePropertyChanged (string propertyName, object oldValue, object
    newValue);
  void RaisePropertyChanging (string propertyName, object newValue);
  void IServiceData.AcceptChanges ( );
  void IServiceData.SetParent (IServiceData parent, string propertyNameInParent);
  // Properties
  IServiceData IServiceData.Parent { get; }
  ChangeState IServiceData.State { get; }
  bool      IServiceData.HasChanges { get; }
  // events
  event PropertyChangingEventHandler PropertyChanging;
  event System.ComponentModel.PropertyChangedEventHandler PropertyChanged;
}
```

The ServiceObject( ) and ServiceObject (IServiceData parent, string propertyNameInParent) constructors initialize a new ServiceObject with appropriate values for the IServiceData.Parent property (or null if not specified).

The void Delete( ) method marks the object as to be deleted when it (or an ancestor) is next passed to ServiceAdapter.Update. On successful update the object will be removed from the parent collection (if it belongs to a collection).

The protected virtual void OnPropertyChanging(PropertyChangingEventArgs e) method is used to raise the PropertyChanging event. The protected virtual void OnPropertyChanged (System.ComponentModel.PropertyChangedEventArgs e) method is used to raise the PropertyChanged event.

The protected void SetAnyProperty (ref ServiceAnyObject currentValue, ServiceAnyObject newValue, string propertyName) method sets the value of an XML-valued property in a subclass of this class. It is only intended to be called by subclass property set accessors, and acts as a helper function to ensure that the correct events are raised in the process of setting the property. The protected void SetStringProperty (ref string currentValue, string newValue, string propertyName) method sets the value of a string property in a subclass of this class. The protected void SetBoolProperty (ref bool currentValue, bool newValue, string propertyName) method sets the value of a boolean property in a subclass of this class. The protected void SetShortProperty (ref short currentValue, short newValue, string propertyName) method sets the value of a short property in a subclass of this class. The protected void SetIntProperty (ref int currentValue, int newValue, string propertyName) method sets the value of an int property in a subclass of this class. The protected void SetLongProperty (ref long currentValue, long newValue, string propertyName) method sets the value of a long property in a subclass of this class. The protected void SetEnum- Property (ref int currentValue, int newValue, System.Type enumType, string propertyName) method sets the value of an enumerated value property in a subclass of this class. The protected void SetStringProperty (ref System.DateTime currentValue, System.DateTime newValue, string propertyName) method sets the value of a datetime property in a subclass of this class. The protected void SetByteArrayProperty (ref byte[ ] currentValue, byte[ ] newValue, string propertyName) method sets the value of a byte array property in a subclass of this class. The protected void SetSpecifierProperty (ref bool currentValue, bool newValue, string specifiedPropertyName) method sets the value of a specifier property (i.e. a property that acts as a presence flag for another property, where the type of the latter cannot encompass a null value such as int) in a subclass of this class. The methods described in this paragraph are only intended to be called by subclass property set accessors, and acts as a helper function to ensure that the correct events are raised and actions performed in the process of setting the property.

The void RaisePropertyChanged (string propertyName, object oldValue, object newValue) method is called by generated subclasses to handle processing of property changes. The void RaisePropertyChanging (string propertyName, object newValue) method is called by generated subclasses to handle processing of proposed property changes. The void IServiceData.AcceptChanges( ) method marks the change state of the object as ChangeState.Unchanged. It also informs the parent object that this object should be regarded as unchanged. This method is called internally by ServiceAdapter.Update and ServiceAdapter.Fill in the result of a successful operation. The void IServiceData.SetParent(IServiceData parent, string propertyNameInParent) method assigns the specified parent to this object and sets the name of the property that represents this object in the parent.

The IServiceData IServiceData.Parent {get;} property returns the parent of this object, or null if the object has no parent. The ChangeState IServiceData.State {get;} property returns the current change state of this object. The bool IServiceData.HasChanges {get;} property returns an indication of whether the object has been changed since the last time it was populated from the service or AcceptChanges was called.

The ServiceObjectCollection class is the basis for all automatically generated data objects that correspond to value collections and is structured as follows:

```
[Serializable]
abstract class ServiceObjectCollection : IServiceObjectCollection
{
  // Constructors
  protected ServiceObjectCollection ( );
  protected ServiceObject (IServiceData parent, string propertyNameInParent);
  // Methods
  protected virtual void OnListChanged
  (System.ComponentModel.ListChangedEventArgs e);
  void IServiceData.AcceptChanges ( );
  void IServiceData.SetParent (IServiceData parent, string
  propertyNameInParent);
  void    IBindingList.AddIndex(System.Reflection.PropertyDescriptor    property);
  void IBindingList.AddNew ( );
  void IBindingList.ApplySort (System.Reflection.PropertyDescriptor property,
    System.ComponentModel.ListSortDirection direction);
  int IBindingList.Find (System.Reflection.PropertyDescriptor property, object key);
  void IBindingList.RemoveIndex (System.Reflection.PropertyDescriptor property);
  void IBindingList.RemoveSort ( );
  void    ICollection.CopyTo    (System.Array    array,    int    index);
  System.Collections.IEnumerator IEnumerator.GetEnumerator ( );
  int IList.Add (object item);
  void IList.Clear ( );
  bool IList.Contains (object item);
  int IList.IndexOf (object item);
  void IList.Insert (int index, object item);
  void IList.Remove (object item);
  void IList.RemoveAt (int index);
  // Properties
  int       Count { get; }
  IServiceData IServiceData.Parent { get; }
  ChangeState IServiceData.State { get; }
  bool      IServiceData.HasChanges { get; }
  bool      IBindingList.AllowEdit { get; }
  bool      IBindingList.AllowNew { get; }
  bool      IBindingList.AllowRemove { get; }
  bool      IBindingList.IsSorted { get; }
  System.ComponentModel.ListSortDirection IBindingList.SortDirection { get; }
  System.Reflection.PropertyDescriptor IBindingList.SortProperty { get; }
  bool      IBindingList.SupportsChangeNotification { get; }
  bool      IBindingList.SupportsSearching { get; }
  bool      IBindingList.SupportsSorting { get; }
  bool      ICollection.IsSynchronized { get; }
  object    ICollection.SyncRoot { get; }
  bool      IList.IsFixedSize { get; }
  bool      IList.IsReadOnly { get; }
```

-continued

```
    object     IList.this[int i] { get; set; }
    // Events
    event System.ComponentModel.ListChangedEventHandler ListChanged;
}
```

The protected ServiceObjectCollection (IServiceData parent, string propertyNameInParent) constructor initializes a new empty ServiceObjectCollection object with appropriate values for the IServiceData.Parent property.

The protected virtual void OnListChanged(System.ComponentModel.ListChangedEventArgs e) method is used to raise the ListChanged event.

The void IServiceData.AcceptChanges( ) method marks the change state of the object as ChangeState.Unchanged. It also informs the parent object that this object should be regarded as unchanged.

The void IServiceData.SetParent(IServiceData parent, string propertyNameInParent) method assigns the specified parent to this object and sets the name of the property that represents this object in the parent.

The object IBindingList.AddNew( ) method adds a new object to the collection and returns a reference to that object. The actual type of the object is determined by the subclass.

The void ICollection.CopyTo(SystemArray array, int index) method copies the elements of the collection to an array, starting at the specified index within the array.

The System.Collections.IEnumerator IEnumerable.GetEnumerator( ) method returns an enumerator that can iterate through the collection.

The int IList.Add(object item) method adds a new item to the list.

The void IList.Clear( ) method removes all items from the list.

The bool IList.Contains(object item) method returns true if and only if the specified item is in the list.

The int IList.IndexOf(object item) method returns the position of the item to the The void IList.Insert(int index, object item) method adds a new item to the list at the specified position.

The void IList.Remove(object item) method removes the first occurrence of the item from the list.

The void IList.RemoveAt(int index) method removes the item from the specified position in the list.

The IServiceData IServiceData.Parent {get;} property returns the parent of this object, or null if the object has no parent.

The ChangeState IServiceData.State {get;} property returns the current change state of this object.

The bool IServiceData.HasChanges {get;} property returns an indication of whether the object has been changed since the last time it was populated from the service or AcceptChanges was called.

The bool IBindingList.AllowEdit {get;} property returns an indication of whether list members can be modified. It always returns true for this implementation.

The bool IBindingList.AllowNew {get;} property returns an indication of whether new items can be added to the list. It always returns true for this implementation.

The bool IBindingList.AllowRemove {get;} property returns an indication of whether members can be removed from the list. It always returns true for this implementation.

The bool IBindingList.IsSupported {get;} method returns an indication of whether the members of the list have been sorted.

The System.ComponentModel.ListSortDirection IBindingList.SortDirection {get;} property returns an indication of the direction in which the members of the list have been sorted.

The System.Reflection.PropertyDescriptor IBindingList.SortProperty {get;} property returns the property that has been selected as the basis for sorting the members of the list.

The bool IBindingList.SupportsChangeNotification {get;} property returns an indication of whether the list will raise ListChanged events.

The bool IBindingList.SupportsSearching {get;} property returns an indication of whether the list supports searching.

The bool IBindingList.SupportsSorting {get;} property returns an indication of whether the list supports sorting. It always returns false for this implementation.

The bool ICollection.IsSynchronized {get;} property returns an indication of whether access to this list is thread-safe.

The object ICollection.SyncRoot {get;} property returns an object that can be used to synchronize access to this list.

The object IList.this[int i] {get; set;} property provides a position-based indexer into the collection.

The bool IList.IsFixedSize {get;} property returns an indication of whether the list has a fixed size.

The bool IList.IsReadOnly {get;} property returns an indication of whether the list is immutable.

The System.ComponentModel.ListChangedEventHandlerListChanged event is raised immediately after the contents of the list are changed.

The PropertyChangingEventHandler PropertyChanging event is raised immediately prior to a property value being changed. The System.ComponentModel.PropertyChangedEventHandlerPropertyChanged event is raised immediately after a property value is changed.

This section defines all the attribute classes. These attributes are used to decorate generated data classes from schemas, and capture data model characteristics. The generator decorates certain properties or classes with these attributes automatically.

When applied to a property, the SpecifierAttribute attribute declares that the property acts as a specifier for another property whose type cannot encompass the notion of "no value assigned". The attribute is defined as follows:

```
[AttributeUsage(AttributeTargets.Property, Inherited=true, Multiple=false]
sealed class SpecifierAttribute : System.Attribute
{
    / Constructors
    SpecifierAttribute (string propertySpecified);
    // Properties
    string PropertySpecified { get; }
}
```

The SpecifierAttribute (string propertySpecified) method initializes a new instance of the SpecifierAttribute class with the given value for the PropertySpecified property. The string PropertySpecified {get;} property returns the name of the property for which the attributed property acts as a specifier.

The ServiceObjectAttribute attribute is used to specify the meta-data for a data object. This attribute may be applied to a class or a property. This is an abstract class and is not instantiated directly. The attribute is structured as follows:

```
[AttributeUsage(AttributeTargets.Class|AttributeTargets.Property,
    Inherited=true, Multiple=false]
abstract class ServiceObjectAttribute : System.Attribute
{
  // Constructors
  protected ServiceObjectAttribute ( );
  // Properties
  bool  IsReadOnly { get; set; }
  bool  IsUniqueForCollection { get; set; }
  bool  IsUniqueForAllCollections { get; set; }
  bool  IsGloballyUnique { get; set; }
  bool  IsAtomicallyUpdateable { get; set; }
  bool  IsQueryable { get; set; }
  bool  IsChangeQueryable { get; set; }
  bool  IsRequired { get; set; }
  string IdentifierProperty { get; set; }
}
```

The ServiceObjectAttribute( ) method initializes a new instance of the ServiceObjectAttribute class all properties set to false. The bool IsReadOnly {get; set;} property determines whether the attributed class or property represents a writable object in accordance with the schemas for the hierarchically-structured document to be operated upon. The bool IsUniqueForCollection {get; set;} property determines whether the attributed class or property represents a value that acts as a key for its parent in the nearest ancestor collection in the schemas (e.g. is this a key for a contact in any given folder). The bool IsUniqueForAllCollections {get; set;} property determines whether the attributed class or property represents a value that acts as a key for its parent in all instances of the nearest ancestor collection. The bool IsGloballyUnique {get; set;} property determines whether the attributed class or property represents a value that acts as a globally unique key (e.g. a GUID).

The bool IsAtomicallyUpdateable {get; set;} property determines whether the attributed class or property can be individually updated or whether updates (add/delete/replace) must be performed on some suitable ancestor node. The bool IsQueryable {get; set;} property determines whether the attributed class or property can be individually queried. The bool IsChangeQueryable {get; set;} property determines whether the attributed class or property can be individually change tracked for synchronization purposes.

The string IdentifierProperty {get; set;} property gets or sets a string value that contains the name of the identifier property for the attributed class. If this value is String.Empty, then it is assumed that the class has no identifier property. The bool IsRequired {get; set;} property determines whether the attributed class or property must have a supplied value to be schema-valid.

The RootObjectAttribute attribute specifies the meta data for a data object that acts as the root of the data hierarchy. This attribute may be applied to a class or a property and has the following structure:

```
[AttributeUsage(AttributeTargets.Class|AttributeTargets.Property, =true,
Multiple=false]
sealed class RootObjectAttribute : ServiceObjectAttribute
{
  // Constructors
  public RootObjectAttribute ( );
}
```

The RootObjectAttribute( ) constructor initializes a new instance of the RootObjectAttribute class with the following properties set to true (all others being false): 1) ServiceObjectAttribute.IsAtomicallyUpdateable, 2) ServiceObjectAttribute.IsQueryable, and 3) ServiceObjectAttribute.IsChangeQueryable.

The BlueObjectAttribute specifies the meta data for a blue data object. A blue data object in a particular data model may define a particular data segment of the hierarchically-structured document that may be operated on as an atomic entity. This attribute may be applied to a class or a property. The attribute may be structured as follows:

```
[AttributeUsage(AttributeTargets.Class|AttributeTargets.Property,
    Inherited=true, Multiple=false]
sealed class BlueObjectAttribute : ServiceObjectAttribute
{
  // Constructors
  public BlueObjectAttribute ( );
}
```

The BlueObjectAttribute( ) attribute initializes a new instance of the BlueObjectAttribute class with the following properties set to true (all others being false): 1) ServiceObjectAttribute.IsAtomicallyUpdateable, 2) ServiceObjectAttribute.IsQueryable, 3) ServiceObjectAttribute.IsChangeQueryable, and 4) ServiceObjectAttribute.IsIdentifiable.

The RedObjectAttribute attribute specifies the meta data for a red service object. A red service object may represent yet another portion(s) of the hierarchically-structured document that may be operated upon as an atomic entity. This attribute may be structured as follows:

```
[AttributeUsage(AttributeTargets.Class|AttributeTargets.Property,
        Inherited=true, Multiple=false]
sealed class RedObjectAttribute : ServiceObjectAttribute
{
    // Constructors
    public RedObjectAttribute ( );
}
```

RedObjectAttribute( ) constructor initializes a new instance of the RedObjectAttribute class with the following properties set to true (all others being false): 1) ServiceObjectAttribute.IsAtomicallyUpdateable, and 2) ServiceObjectAttribute.IsQueryable.

The BlackObjectAttribute attribute specifies the meta data for a black data object. This attribute may be applied to a class or a property. In a particular data model, black objects may be used to represent a portion of the hierarchically-structured document that may not be operated upon as an atomic entity. The attribute may be structured as follows:

```
[AttributeUsage(AttributeTargets.Class|AttributeTargets.Property,
        Inherited=true, Multiple=false]
sealed class BlackObjectAttribute : ServiceObjectAttribute
{
    // Constructors
    public BlackObjectAttribute ( );
}
```

BlackObjectAttribute( ) constructor initializes a new instance of the BlackObjectAttribute class with all properties set to false.

A ServiceObjectCollectionAttribute attribute specifies the meta data for a service object collection. This attribute may be applied to a class or a property. This class is abstract and cannot be created directly. The attribute may be structure as follows:

```
[AttributeUsage(AttributeTargets.Class|AttributeTargets.Property,
        Inherited=true, Multiple=false]
abstract class ServiceObjectCollectionAttribute : System.Attribute
{
    // Constructors
    protected ServiceObjectCollectionAttribute
    (System.Type memberType);
    // Properties
    System.Type MemberType { get; }
    bool    IsMemberAtomicallyUpdateable { get; set; }
}
```

The ServiceObjectCollectionAttribute (System.Type memberType) constructor initializes a new instance of the ServiceObjectCollectionAttribute class with the specified value for the MemberType property and with the property IsMemberAtomicallyUpdateable set to false.

The System.Type MemberType {get;} property returns the type of the members of the attributed collection. The bool IsMemberAtomicallyUpdateable {get;} property returns whether the members of this collection can be individually updated against the service.

The BlueObjectCollectionAttribute specifies the meta data for a collection of blue data objects and may have the following structure:

```
[AttributeUsage(AttributeTargets.Class|AttributeTargets.Property,
        Inherited=true, Multiple=false]
sealed class BlueObjectCollectionAttribute :
ServiceObjectCollectionAttribute
{
    // Constructors
    public BlueObjectCollectionAttribute (System.Type memberType);
}
```

The BlueObjectCollectionAttribute (System.Type memberType) constructor initializes a new instance of the BlueObjectCollectionAttribute class with the specified value for ServiceObjectCollectionAttribute.MemberType and the value of the ServiceObjectCollectionAttribute.IsMemberAtomciallyUpdateable property set to true.

The BlueAnyObjectCollectionAttribute specifies the meta data for a collection of blue data objects representing vendor extensions. This attribute may have the following structure:

```
[AttributeUsage(AttributeTargets.Class|AttributeTargets.Property,
        Inherited=true, Multiple=false]
sealed class BlueAnyObjectCollectionAttribute :
ServiceObjectCollectionAttribute
{
    // Constructors
    public BlueAnyObjectCollectionAttribute ( );
}
```

The BlueAnyObjectCollectionAttribute (constructor initializes a new instance of the BlueAnyObjectCollectionAttribute class with a value of typeof(ServiceAnyObject) for ServiceObjectCollectionAttribute.MemberType and the value of the ServiceObjectCollectionAttribute.IsMemberAtomciallyUpdateable property set to true.

The RedObjectCollectionAttribute specifies the meta data for a collection of red data objects. This attribute may have the following structure:

```
[AttributeUsage(AttributeTargets.Class|AttributeTargets.Property,
        Inherited=true, Multiple=false]
sealed class RedObjectCollectionAttribute :
ServiceObjectCollectionAttribute
{
    // Constructors
    public RedObjectCollectionAttribute (System.Type memberType);
}
```

The RedObjectCollectionAttribute (System.Type memberType) constructor initializes a new instance of the RedObjectCollectionAttribute class with the specified value for ServiceObjectCollectionAttribute.MemberType and the value of the ServiceObjectCollectionAttribute.IsMemberAtomciallyUpdateable property set to true.

The RedAnyCollectionAttribute specifies the meta data for a collection of red data objects representing vendor extensions. This attribute may have the following structure:

```
[AttributeUsage(AttributeTargets.Class|AttributeTargets.Property,
        Inherited=true, Multiple=false]
sealed class RedAnyObjectCollectionAttribute :
ServiceObjectCollectionAttribute
{
// Constructors
public RedAnyObjectCollectionAttribute ( );
}
```

The RedAnyObjectCollectionAttribute( ) constructor initializes a new instance of the RedAnyObjectCollectionAttribute class with a value of typeof(ServiceAnyObject) for ServiceObjectCollectionAttribute.MemberType and the value of the ServiceObjectCollectionAttribute.IsMemberAtomciallyUpdateable property set to true.

The BlackObjectCollectionAttribute specifies the meta data for a collection of black data objects. This attribute may have the following structure:

```
[AttributeUsage(AttributeTargets.Class|AttributeTargets.Property,
        Inherited=true, Multiple=false]
sealed class BlackObjectCollectionAttribute :
ServiceObjectCollectionAttribute
{
```

-continued

```
    // Constructors
    public BlackObjectCollectionAttribute (System.Type memberType);
}
```

When a caller instantiates an early-bound data class, no data is retrieved from the underlying service. Instead, the caller explicitly specifies what subset of the data they wish to be retrieved. There may be cases (for example, if the caller wishes only to add a new contact to myContacts) where the caller does not need to retrieve any data.

Each early-bound red or blue object (or a collection thereof) supports the ServiceAdapter.Fill mechanism to control how and when the object is populated. The generated class includes metadata (as code attribution) from the underlying schemas that help the adapter determine how an instance of the class can be identified for the purposes of querying.

The generated early-bound classes use data encapsulation, which is defined to mean the abstraction of content data away from its underlying XML Serialization into more intuitive code objects. The process by which code objects are generated from their XML schema definitions is best illustrated by a simple example. We will use a simplified version of a MyServices Profile service schema for this purpose. The schema is defined as follows:

```
<xsd:schema
  xmlns:xsd="http://www.w3.org/2001/XMLSchema"
  xmlns:xdb="urn:schemas-microsoft-com:xdb"
  xmlns:hs="http://schemas.microsoft.com/hs/2002/04/core"
  xmlns:mc="http://schemas.microsoft.com/hs/2002/04/myCalendar"
  targetNamespace="http://schemas.microsoft.com/hs/2002/04/myProfile"
  xmlns="http://schemas.microsoft.com/hs/2002/04/myProfile"
  elementFormDefault="qualified"
  version="1.0">

  <xsd:annotation>
    <xsd:appinfo>
      <xdb:blue select="/myProfile"/>

      <xdb:blue select = "/myProfile/*"/>

      <xdb:red select = "//@id">

      <xdb:red select = "/myProfile/name/$any"/>

    </xsd:appinfo>
  </xsd:annotation>

  <xsd:import namespace=http://schemas.microsoft.com/hs/2002/04/core"
    schemaLocation="hscommon.xsd"/>

  <xsd:element name="myProfiie" type="myProfileType"/>
  <xsd:complexType name="myProfileType">
    <xsd:sequence>
      <xsd:element name="name" type="nameType"
        maxOccurs="unbounded"/>
      <xsd:any processContents="skip" namespace="##other"/>
    </xsd:sequence>
  </xsd:complexType>

  <xsd:complexType name="nameType">
    <xsd:sequence>
      <xsd:element name="givenName" type="xsd:string"
        minOccurs="0"/>
      <xsd:element name="lastName" type="xsd:string"
      minOccurs="0"/>
      <xsd:any processContents="skip" namespace="##other"/>
    </xsd:sequence>
    <xsd:attribute name="id" type="hs:idType" use="required"/>
  </xsd:complexType>

</xsd:schema>
```

In summary, the schema defines an XML element called myProfile, which can contain an unbounded collection of name elements, each of which is comprised of two optional subelements to describe the given name and last name followed by arbitrary XML content. Each name element is id-attributed. The myProfile element may also contain arbitrary XML content.

The generator, when run against this schema, produces the following class to represent the content document of myProfile.

```
Generated Service-specific Assembly
[XmlRoot("myProfile", Namespace="http://schemas.microsoft.com/
    hs/2002/04/myProfile",IsNullable="false")]
[RootObject]
    public class myProfileType : ServiceObject
        {
        [XmlElement("name")]
        [BlueObjectCollection(typeof(nameType)]
        public nameTypeCollection name { get; }
        [XmlAnyElementAttribute]
        [BlueAnyObjectCollection]
        public ServiceAnyObjectCollection any { get; }
        }
    [XmlType(Namespace="http://schemas.microsoft.com/
    hs/2002/04/myProfile")]
    [BlueObjectCollection (typeof(nameType))]
    class nameTypeCollection : ServiceObjectCollection
        {
        public void Add (nameType m);
        public void Remove (nameType m);
        public new nameType this[int i] { get; set; }
        public nameType AddNew ( );
        }
    [XmlRoot("name",
        Namespace="http://schemas.microsoft.com/
        hs/2001/10/myProfile")]
    [XmlType(Namespace="http://schemas.microsoft.com/
    hs/2001/10/myProfile")]
    [BlueObject(PropertyIdentifier="id")]
    public class nameType : ServiceObject
        {
        [XmlAttribute(DataType="nonNegativeInteger")]
        [RedObject(IsGloballyUnique=true)]
        public string id { get; set; }
    [RedObject]
        public string givenName;
    [RedObject]
        public string lastName;
    [XmlAnyElementAttribute]
```

-continued

```
    [BlueAnyObjectCollection]
    public ServiceAnyObjectCollection any { get; }
}
```

Note that a class myProfileType has been generated to represent the XML type myProfileType. This class is derived from the ServiceObject class, and is attributed with RootObjectAttribute to declare that it forms the root of the service document. For each child subelement of myProfile, the class declares a public property to represent that subelement. The purpose of exposing the child elements as properties is two-fold; it leads to a more natural programming style (unlike methods) and it allows internal code (such as auditing or validation) to be executed when the property is modified (unlike fields).

The class nameTypeCollection models the collection of name elements. It is derived from ServiceObjectCollection. It exposes strongly typed methods to add and remove items from the collection, as well as a default indexer. It is attributed with BlueObjectCollectionAttribute to indicate that it is composed of blue objects and to indicate the type of the contained element.

Each member of the collection is represented using the nameType class, which has simple member properties that encapsulate the subelements and attributes of the name element. The nameType class derives from from the ServiceObject class. The nameType class is also attributed with BlueObjectAttribute to indicate that it is a blue object.

Each generated class carries its own XML serialization information to allow it to be serialized to XML and deserialized from XML.

The nameType and myProfileType classes also have child properties called any of type ServiceAnyObjectCollection; this represents the vendor extension data expressed in raw XML form. Note that it is possible to modify these classes to carry strongly bound properties for "known" vendor extensions.

To illustrate how the principles of the present invention simplify the source code, consider the following example, in which VB.NET source code is used to directly commit data changes to the hierarchical structure of the desired document by directly referencing that structure. Line numbers are added for clarity.

```
If cardChanged Then
    Dim replaceRequest As New replaceRequestType( )
    replaceRequest.select = "/m:myWallet/m:wallet[@id="& cardID
    &"']"
    ReDim replaceRequest.ItemsElementName(0)
    replaceRequest.ItemsElementName(0) =
    myWallet.ItemsChoiceType1.card
    ReDim replaceRequest.Items(0)
    replaceRequest.Items(0) = card
    Dim replaceResponse = myWallet.replace(replaceRequest)
Else If typeOfCardChanged Or networkBrandChanged Then
    Dim needToPerformUpdate as Boolean = _
        typeOfCardChanged And networkBrandChanged
    Dim replaceRequest1 as replaceRequestType
    Dim replaceRequest2 as replaceRequestType
    If TypeOfCardChanged Then
        replaceRequest1 = New replaceRequestType( )
        If needToPerformUpdate Then
        replaceRequest1.select = "."
    Else
        replaceRequest1.select = "/m:myWallet"
    End If
```

-continued

```
    replaceRequest1.select &="/m:wallet[@id="'_
        cardId & "']/m:typeOfCard
    ReDim ReplaceRequest1.ItemsElementName(0)
    replaceRequest1.ItemsElementName(0) = _
        ItemsChoiceType1.typeOfCard
    ReDim replaceRequest1.Items(0)
    replaceRequest1.Items(0) = card.typeOfCard
EndIf
If networkBrandChanged Then
    replaceRequest2 = New replaceRequestType( )
    If needToPerformUpdate Then
        replaceRequest2.select="."
    Else
        replaceRequest2.select = "/m:myWallet"
    End If
    replaceRequest2.select += "/m:wallet[@id="'&_
        cardId & "']/m:networkBrand
    ReDim replaceRequest2.ItemsElementName(0)
    replaceRequest2.ItemsElementName(0)=_
            myWallet.ItemsChoiceType1.networkBrand
        ReDim replaceRequest2.Items(0)=card.networkBrand
    EndIf
    If NeedToPerformUpdate Then
        Dim updateRequest as New updateRequestType( )
        ReDim updateRequest.updateBlock(0)
        Dim updateBlock as New UpdateBlockType( )
        Redim updateBlock.replaceRequest(1)
        updateBlock.replaceRequest(0) = replaceRequest1
        updateBlock.replaceRequest(1) = replaceRequest2
        updateBlock.select = "/"
        updateBlock.onError = rollbackBlockAndFail
        Dim updateResponse = myWallet.update(updateRequest)
    Else If Not (replaceRequest1 is nothing) Then
        Dim replaceRequest = myWallet.replace(replaceRequest1)
    Else If Not (replaceRequest2 is nothing) Then
        Dim replaceResponse = myWallet.replace(replaceRequest2)
    End If
End If
```

Key characteristics of this code are that the caller uses its own change tracking information to determine what kind of SOAP message to build. Also, the caller manually builds the request structures. The caller also has to construct XPATH expressions to identify the replaced items. The caller also has set tags in order to correctly drive the serialization process. Now let us refer to a functionally identical piece of source code that uses the managed code module 227 in accordance with the principles of the present invention. That managed code is illustrated as follows:

1. ServiceAdapter.Update(card)

Note that the managed code was reduced from over 50 lines of code to just one line of code. This simplification reduces the complexity and difficulty associated with drafting code that interfaces with hierarchically-structured documents.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that has access to a service that maintains hierarchically-structured documents of at least one particular class, comprising:

a processor; and one or more computer-readable media having computer-executable instructions, that when executed, implement a method for facilitating the programming of source code wherein the programmer is relieved of having to track the document-specific schema of the hierarchically-structured documents that may be called and operated upon by the computer system when running the compiled source code by permitting the computer system's processor to issue a function call that will interface with an early-bound object, thereby permitting the early-bound object to adjust change tracking information that will result in altering one of the hierarchically-structured documents of a particular class rather than having to access the specific schema of the hierarchical document itself to do so, wherein the method comprises:

accessing a description of the schema of one or more hierarchically-structured documents of a particular class, the particular class of hierarchically-structured documents having properties and methods that may be performed on the hierarchically-structured documents of the particular class, wherein at least one of the properties includes change tracking information;

converting the accessed description of the schema into at least one corresponding early-bound object that has data fields for storing at least some of the properties as well as at least some of the methods that correspond to the hierarchically-structured documents of the particular class, wherein the early-bound object comprises the change tracking information;

detecting a property modification by receiving a request to interface with the early-bound object in order to modify at least one property of the at least one early-bound object as a result of a function call from the microprocessor running the compiled program, the function call interfacing with the at least one early-bound object rather than with the particular document description of the schema for the one or more hierarchical documents of the particular class;

an act of causing the at least one early-bound object that received the modification request to adjust the change tracking information of the at least one early-bound object in response to the requested modification; and causing the at least one early-bound object to then either directly or indirectly automatically manipulate a corresponding hierarchically-structured document of the particular class to reflect the property modification.

2. A computing system in accordance with claim 1, wherein the corresponding hierarchically-structured document of the particular class comprises an eXtenstible Markup Language (XML) document.

3. A computing system in accordance with claim 1, wherein the description of the schema of hierarchically-structured documents of a particular class includes an identification of atomically-editable portions of hierarchically-structured documents of the particular class.

4. A computing system in accordance with claim 3, wherein the act of converting the description of the schema into at least one early-bound object comprises an act of preserving the identification of atomically-editable portions of hierarchically-structured documents of the particular class in the early-bound object.

* * * * *